(12) United States Patent
Shah et al.

(10) Patent No.: US 8,192,788 B1
(45) Date of Patent: Jun. 5, 2012

(54) SINGLE STEP CURRENT COLLECTOR DEPOSITION PROCESS FOR ENERGY STORAGE DEVICES

(75) Inventors: Nirav S. Shah, Pleasanton, CA (US); Murali Ramasubramanian, Fremont, CA (US)

(73) Assignee: Enovix Corporation, Fremont, CA (US)

( * ) Notice: Subject to any disclaimer, the term of this patent is extended or adjusted under 35 U.S.C. 154(b) by 582 days.

(21) Appl. No.: 12/426,084

(22) Filed: Apr. 17, 2009

Related U.S. Application Data

(60) Provisional application No. 61/045,879, filed on Apr. 17, 2008.

(51) Int. Cl.
*B05D 5/12* (2006.01)
(52) U.S. Cl. ...................................................... 427/115
(58) Field of Classification Search .................... 427/115
See application file for complete search history.

(56) References Cited

U.S. PATENT DOCUMENTS

| | | | |
|---|---|---|---|
| 6,090,505 A | 7/2000 | Shimamura et al. | |
| 6,235,427 B1 | 5/2001 | Idota et al. | |
| 7,297,271 B2 * | 11/2007 | Onishi et al. | 210/510.1 |
| 2005/0079418 A1 * | 4/2005 | Kelley et al. | 429/231.95 |
| 2006/0093871 A1 | 5/2006 | Howard | |
| 2008/0003490 A1 | 1/2008 | Christensen | |
| 2008/0032170 A1 * | 2/2008 | Wainright et al. | 429/30 |
| 2009/0148764 A1 * | 6/2009 | Kwak et al. | 429/162 |

FOREIGN PATENT DOCUMENTS

| | | |
|---|---|---|
| JP | 2003323882 A | 11/2003 |
| KR | 20030044508 A | 6/2003 |
| WO | WO 2008/089110 A1 | 7/2008 |
| WO | WO 2009/129490 A1 | 10/2009 |
| WO | WO 2009/140300 A1 | 11/2009 |

OTHER PUBLICATIONS

Broussely, Michel et al., "Li-ion batteries and portable power source prospects for the next 5-10 years", Journal of Power Sources, 136, pp. 386-394 (2004).
Harraz, F.A. et al., "Immersion plating of nickel onto a porous silicon layer from fluoride solutions", Phys. Stat. Sol. (A), vol. 197, No. 1, pp. 51-56 (2003).
Harraz, Farid A. et al., "Different Behavior in Immersion Plating of Nickel on Porous Silicon from Acidic and Alkaline Fluoride Media", Journal of The Electrochemical Society, vol. 150, No. 5, pp. C277-C284 (2003).
Long, Jeffrey W. et al., "Three-Dimensional Battery Architectures", Chemical Reviews (Aug. 14, 2004), vol. 104, No. 10, pp. 4463-4492.
Obrovac, M. N. et al., "Reversible Cycling of Crystalline Silicon Powder", Journal of The Electrothemical Society, vol. 154, No. 2, pp. A103-A108 (2007).
Waidmann, S. et al., "Tuning nickel silicide properties using a lamp based RTA, a heat conduction based RTA or a furnace anneal", Microelectronic Engineering 83, pp. 2282-2286 (2006).
Xu, Chengkun et al., "Nickel Displacement Deposition of Porous Silicon with Ultrahigh Aspect Ratio", Journal of the Electrochemical Society, vol. 154, No. 3, pp. D170-D174 (2007).
Zhang, Xi et al., "High Aspect Ratio Nickel Structures Fabricated by Electrochemical Replication of Hydrofluoric Acid Etched Silicon", Electrochemical and Solid-State Letters, vol. 9, No. 9, pp. C150-C152 (2006).

* cited by examiner

*Primary Examiner* — Brian K Talbot
(74) *Attorney, Agent, or Firm* — Bryan Cave LLP

(57) ABSTRACT

The present invention is directed to methods of forming current collectors of an energy storage device. The current collectors can be formed either before forming the anode/cathode, or after forming the anode/cathode. In one embodiment, a current collector material is simultaneously deposited on an anode support structure and a cathode support structure to form an anode current collector and a cathode current collector. In another embodiment, a current collector material is simultaneously deposited on an anode and a cathode to form an anode current collector and a cathode current collector.

24 Claims, 6 Drawing Sheets

SINGLE STEP CURRENT COLLECTOR DEPOSITION PROCESS FOR ENERGY STORAGE DEVICES

This application claims priority to U.S. Provisional Application No. 61/045,879, filed Apr. 17, 2008; the content of which is incorporated herein by reference in its entirety.

FIELD OF THE INVENTION

The present invention relates to energy storage systems and devices, such as batteries, fuel cells, and electrochemical capacitors. The present invention relates specifically to current collectors for energy storage devices and to more efficient methods for manufacturing current collectors for these devices.

BACKGROUND OF THE INVENTION

Existing energy storage devices, such as batteries, fuel cells, and electrochemical capacitors, typically have planar architectures with an actual surface area of each component being roughly equivalent to a geometrical area, with a porosity being responsible for any area increase over the geometrical area.

FIG. 1 shows a cross sectional view of an existing energy storage device, a lithium-ion battery 15. The battery 15 includes a cathode current collector 10, on top of which a cathode 11 is assembled. This layer is covered by a separator 12, over which an assembly of an anode current collector 13 and an anode 14 are placed. This stack is then sometimes covered with another separator layer (not shown) above the anode current collector 13, and is then rolled and stuffed into a can to assemble the battery. During a charging process, lithium leaves the cathode 11 and travels through an electrolyte in the separator 12 as a lithium ion into the anode 14. During a discharge process, the lithium leaves the anode 14, travels through the separator 12 and passes through to the cathode 11. The cathode current collector 10 and anode current collector 13 typically can weigh from 5-25% of the battery weight reducing the overall energy density of the battery accordingly.

Three dimensional energy storage devices can produce higher energy storage and retrieval per unit geometrical area than conventional two dimensional (planar) devices. A three-dimensional energy storage device can be one in which any one (or more) of an anode, a cathode, and a separator are non-planar in nature, and an actual surface area for such non-planar component is greater than twice its geometrical surface area. In some instances, a separation between two height planes on a third dimension should be at least greater than a periodicity in an x-y plane divided by a square root of two. For example, for a 1 cm×1 cm sample, a geometrical surface area is 1 cm². However, if the sample is not flat but has a groove in a depth dimension whose depth is greater than one divided by the square root of two, or 0.707 cm, then its actual surface area would be greater than 2 cm². Three dimensional energy storage devices also have a decided advantage in providing a higher rate of energy retrieval than planar counterparts for a specific amount of energy stored, such as by minimizing or reducing transport distances for electron and ion transfer between an anode and a cathode. These devices can be more suitable for miniaturization and for applications where a geometrical area available for a device is limited and where energy density requirement is higher than what can be achieved with a planar device.

Three-dimensional energy storage devices, like planar devices, use current collectors to collect the electrical energy generated by the energy storage device and connect it to an outside device so that the outside device can be electrically powered.

SUMMARY OF THE INVENTION

The present invention is directed to methods of forming current collectors of an energy storage device. The current collectors can be formed either before forming the anode/cathode, or after forming the anode/cathode. In one embodiment, the method comprises the steps of: obtaining a current collector support structure comprising an anode support structure, a cathode support structure, and a substrate, wherein said anode support structure and said cathode support structure are separately attached to the substrate; depositing a current collector material on the anode support structure to form an anode current collector; and simultaneously depositing the current collector material on the cathode support structure to form a cathode current collector.

In another embodiment, the method comprises the steps of: obtaining an electrode structure comprising an anode, a cathode, and a substrate, wherein the said anode and said cathode are separately attached to the substrate; depositing a current collector material on the anode to form an anode current collector; and simultaneously depositing the current collector material on the cathode to form a cathode current collector.

The current collectors can be deposited by a variety of methods such as electrochemical deposition, electroless deposition, electrophoretic deposition, displacement deposition, chemical vapor deposition, a printing technique (inkjet of paste fill), or sputter deposition.

DETAILED DESCRIPTION OF THE INVENTION

The present invention relates to energy storage systems and devices, such as batteries, fuel cells, and electrochemical capacitors. Embodiments of the invention relate to the design and manufacture of an electrochemical energy storage device that uses a one step process to deposit an anode current collector material and a cathode current collector material simultaneously. The use of a single-step deposited current collector material to form a current collector can be implemented in both two dimensional and three dimensional energy storage device architectures. The methods of the present invention can reduce the number of manufacturing steps and process complexity required to make anode and cathode current collectors.

The present invention is directed to a method of forming current collectors of an energy storage device comprising: obtaining a current collector support structure comprising an anode support structure, a cathode support structure, and a substrate, wherein said anode support structure and said cathode support structure are separately attached to the substrate; depositing a current collector material on the anode support structure to form an anode current collector; and simultaneously depositing the current collector material on the cathode support structure to form a cathode current collector.

The present invention is also directed to a method of forming current collectors of an energy storage device comprising: obtaining an electrode structure comprising an anode, a cathode, and a substrate wherein said anode and said cathode are separately attached to the substrate; depositing a current collector material on the anode to form an anode current collector; and simultaneously depositing the current collector material on the cathode to form a cathode current collector.

A critical component of the present invention is the simultaneous deposition of both anode and cathode current collector. Prior art includes many examples wherein a substractive process is done post deposition to obtain separate cathode current collector and anode current collector. In the present invention, separate electrically isolated anode and cathode current collectors are simultaneously formed in a single step. "Electrically isolated" means that the resistance between the anode and cathode current collectors (before filling with electrolyte) is >1 megaohm, preferably >10 megaohms. The current collectors can be formed either prior to, or after forming the anode and cathode.

Figure 1:
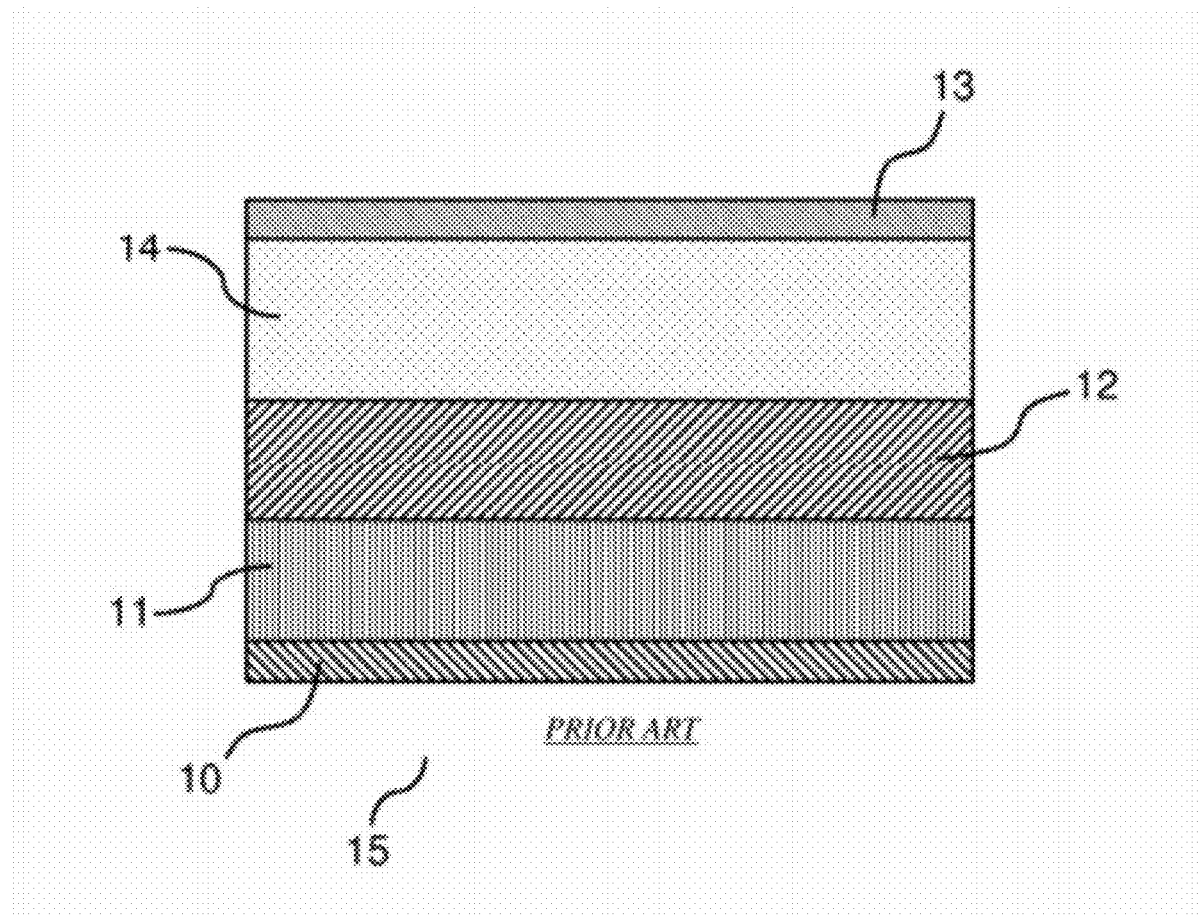
FIG. 1 depicts the prior art lithium-ion battery.
Figure 2:
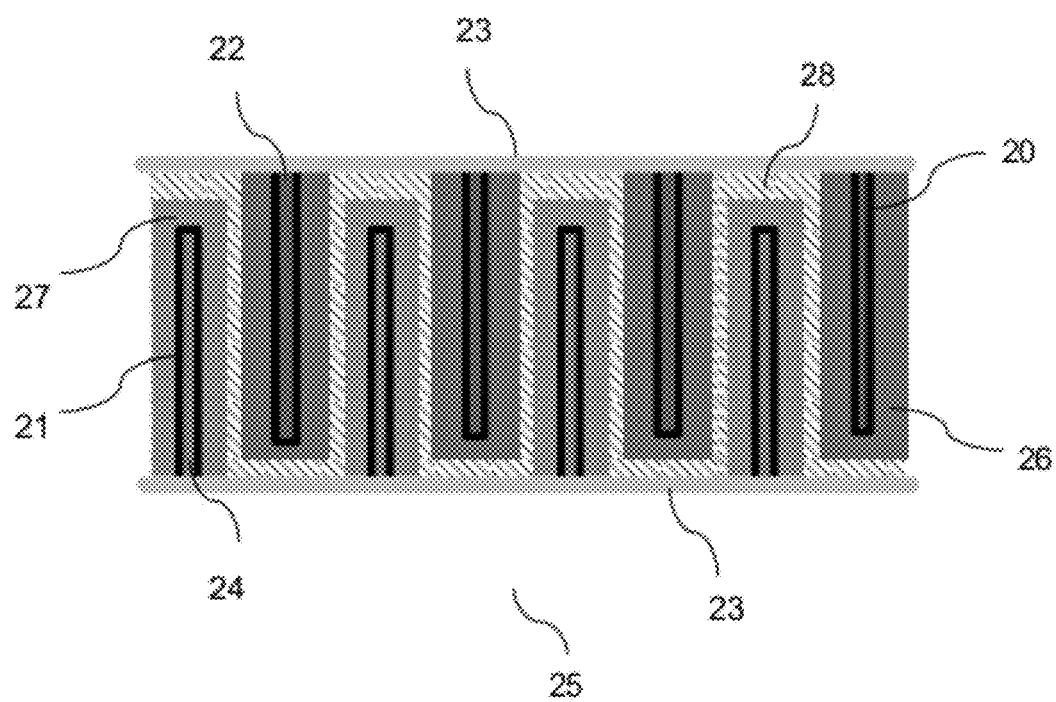
FIG. 2 depicts a three-dimensional energy storage device 25 comprising an anode 26 and cathode 27, a separator 28 containing an electrolyte, an anode current collector 20, and cathode current collector 21.
Figure 3:
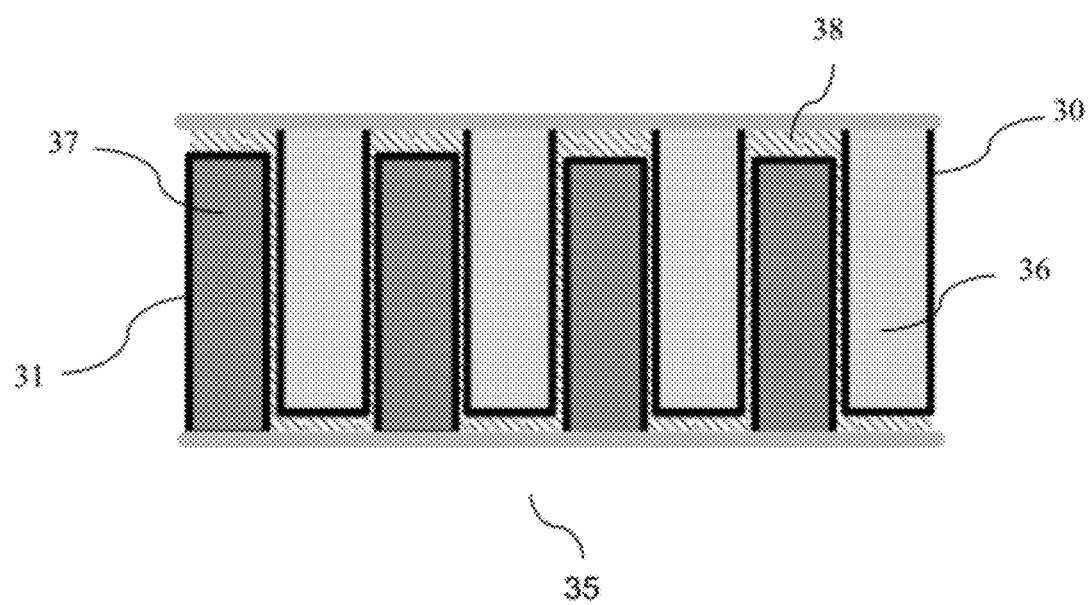
FIG. 3 depicts a three-dimensional energy storage device 35 comprising an anode 36 and cathode 37, a separator 38 containing an electrolyte, an anode current collector 30, and cathode current collector 31.

Embodiments of the current collectors formed by the methods of the present invention are illustrated in FIGS. 2 and 3. As shown in FIG. 2, prior to forming the anode and cathode, a current collector material is simultaneously deposited on opposing electrode support structures of the energy storage device. The anode support structure 22 and the cathode support structure 24 are both exposed to processing such that a current collector material can be formed on both at the same time. FIG. 2 shows a schematic illustration of a three-dimensional energy storage device 25 comprising an anode 26 and cathode 27, a separator 28 containing an electrolyte, an anode current collector 20, and cathode current collector 21. The anode current collector 20 is formed on an anode support structure 22. The cathode current collector 21 is formed on a cathode support structure 24. The anode support structure 22 and the cathode support structure 24 are the structures upon which the anode and cathode respectively are formed. The anode support structure 22 and the cathode support structure 24 can be the same material or a different material. Suitable materials for anode/cathode support structure include silicon, germanium, insulating oxides such as silica, ceramics such as alumina, and polymers such as polyimide. The structures 22, 24 are separately attached to a substrate 23. Suitable substrate materials include insulating oxides such as silica, ceramics such as alumina, and polymers such as polyimide. According to the present invention, the anode current collector material and cathode current collector material are simultaneously deposited. The deposited current collector material can alloy or react with the anode, cathode, anode support structure, or cathode support structure so that the anode current collector 20 and the cathode current collector 21 formed by the processes of the present invention can be different materials even though the current collector material deposited is the same.

After deposition of the current collector material, the remaining electrode materials can be formed and the components assembled to form the energy storage device as shown in FIG. 2.

Alternatively, as shown in FIG. 3, in a battery or other three-dimensional energy storage device 35, the current collectors are simultaneously formed after forming the anode 36 and cathode 37. FIG. 3 shows a schematic illustration of a three-dimensional energy storage device 35 comprising an anode 36 and cathode 37, a separator 38 containing an electrolyte, an anode current collector 30, and cathode current collector 31. In this embodiment, the anode current collector material and cathode current collector material are simultaneously deposited on the anode or the cathode respectively. The deposited current collector material can alloy or react with the anode, or cathode, so that the anode current collector 30 and the cathode current collector 31 formed by the processes of the present invention can be different materials even though the current collector material deposited is the same. After deposition of the current collector material, the electrode structure can be assembled with the electrolyte and other components to form an energy storage device 35.

The deposition of the current collector material can be achieved by using techniques such as electrochemical deposition, electroless deposition, electrophoretic deposition, displacement deposition, sputtering techniques, evaporative deposition, pasting, lithography, sintering, and so forth. The current collector material can be any conductive material, or material that becomes conductive, that serves to collect and conduct electrical energy from within the energy storage device to some outside device without adversely affecting the performance of the energy storage device. Therefore, the current collector material must be chosen so that it is compatible with the anode and cathode and does not corrode or otherwise adversely affect the anode and cathode materials. Carbon is an example of a current collector material that can be used that is compatible with typical anode and cathode materials. Other current collector materials that can used include certain noble metals, such as platinum or other metals shown not to corrode at voltages used for the energy storage device (typically 0-5V) such as titanium and tantalum. In addition, selected metals which alloy with the substrate, electrode support structures, anode, or cathode material can be used, if they do not corrode or inhibit battery performance. For example, deposited metallic current collector materials can be converted to metal-semiconductor-alloy current collectors on semiconductor-containing electrodes or support structures. An example of a current collector material of this type is nickel. Nickel deposited on a silicon-containing support structure or electrode can be converted to nickel silicide by annealing.

Figure 4:
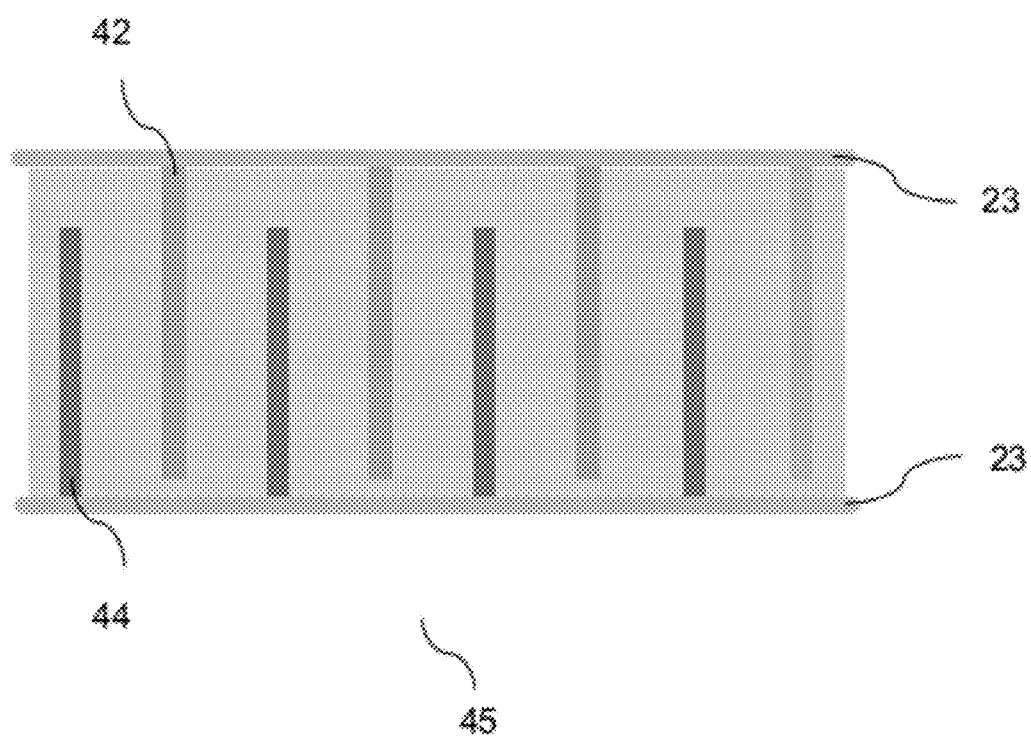
FIG. 4 depicts a three-dimensional electrode support structure 45 upon which the current collectors of the present invention can be formed.

FIG. 4 is a representation of a three-dimensional electrode support structure 45 upon which the current collectors of the present invention can be formed. The electrode support structure 45 shown in FIG. 4 can be manufactured using a silicon substrate using standard semiconductor processing techniques for instance. The electrode support structure 45 contains an anode support structure 42 and cathode support structure 44 formed on a substrate 43. The anode support structure 42 and the cathode support structure 44 can be the same material or different materials. The anode support structure 42 and the cathode support structure 44 can be formed using the following non-limiting techniques: reactive ion etch, subtractive chemical etching, subtractive stamping, additive extrusion, additive electrochemical deposition, additive electroless deposition, additive electrophoretic deposition, and the like.

Figure 5:
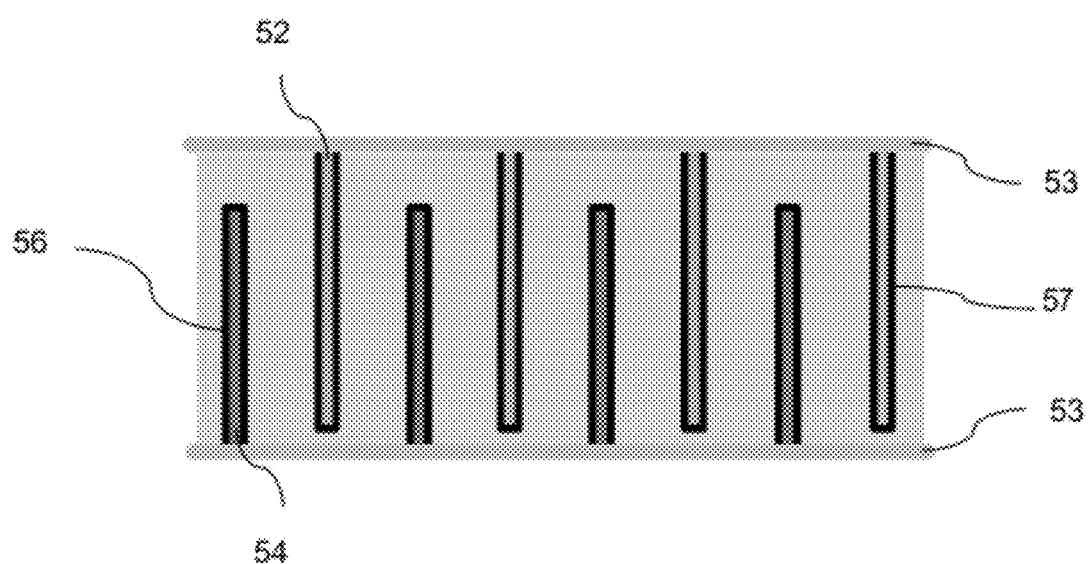
FIG. 5 depicts a three-dimensional electrode support structure 45 of FIG. 4, after formation of the anode current collector 57 and cathode current collector 56.

FIG. 5 is a representation of the three-dimensional electrode support structure 45 of FIG. 4 after formation of the anode current collector 57 and cathode current collector 56 according to an embodiment of the present invention. The processes for depositing the current collector material can include process such as electrochemical deposition, electroless deposition, electrophoretic deposition, displacement deposition, chemical vapor deposition, printing techniques such as inkjet or pasted fill to form the current collector. In the embodiment shown in FIG. 5, a current collector material is simultaneously deposited on both the anode support structure 52 and cathode support structure 54. The deposited current collector material forms or is modified to form the anode current collector 57 and the cathode current collector 56.

In electrochemical deposition, the anode current collector material and the cathode current collector material can be electrochemically deposited by shorting the anode support structure 52 and the cathode structure 54 together and placing the assembly in an electroplating bath, such as a nickel plating bath. Alternatively, the anode current collector material and the cathode current collector material can be electrolessly deposited by placing the electrode support structure 45 in an electroless bath, such as a nickel electroless bath. Also, the anode current collector material and the cathode current collector material can be electrophoretically deposited by shorting the anode support structure 52 and the cathode structure 54 together and placing the electrode support structure 45 in an electrophoretic bath, such as a conductive carbon electrophoretic plating bath. Alternatively, the anode current collector material and the cathode current collector material can be displacement deposited by placing the electrode support structure 45 in a displacement bath, such as a nickel immersion bath. Alternatively, anode current collector material and the cathode current collector material can be deposited selectively on the anode support structure 52 and the cathode structure 54 respectively using chemical vapor deposition of the chosen current collecting material. Alternatively, the anode current collector material and the cathode current collector material can be deposited as particles, such as conductive carbon, in slurry on the anode support structure 52 and the cathode structure 54. The dispersion agent in the slurry can then be evaporated off, leaving just the conductive current collector particles in place atop the substrate structure to form the anode current collector 57 and the cathode current collector 56.

The methods of the present invention can further comprise sintering the deposited current collector material to form the anode current collector 57 and the cathode current collector 56. Sintering of the current collector material is done to form a more cohesive bond to the anode support structure 52 and the cathode structure 54 as well as to improve conductivity of the current collecting layer and overall performance.

Figure 6A:
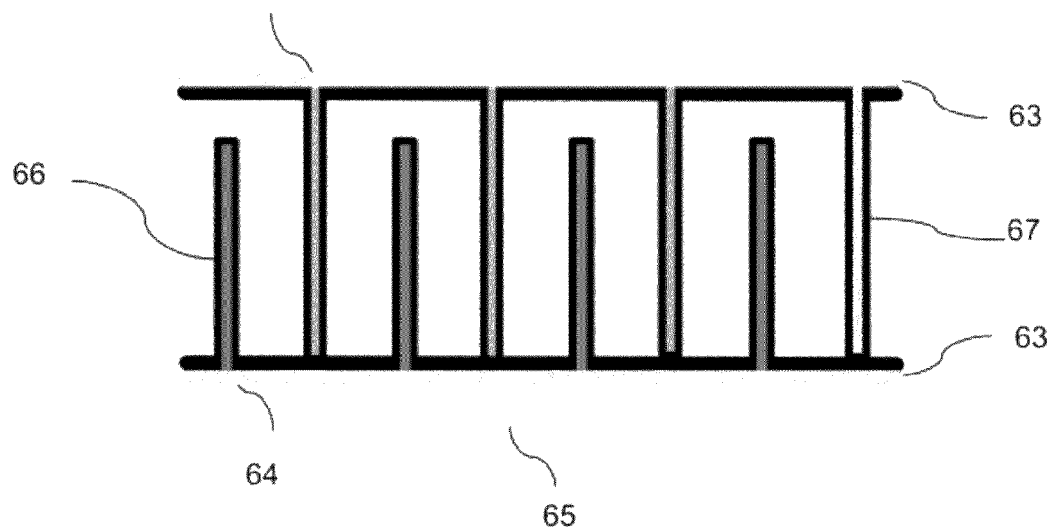
FIG. 6A illustrates deposition of a current collector material on an electrode support structure 65 by a process such as sputter deposition.
Figure 6B:
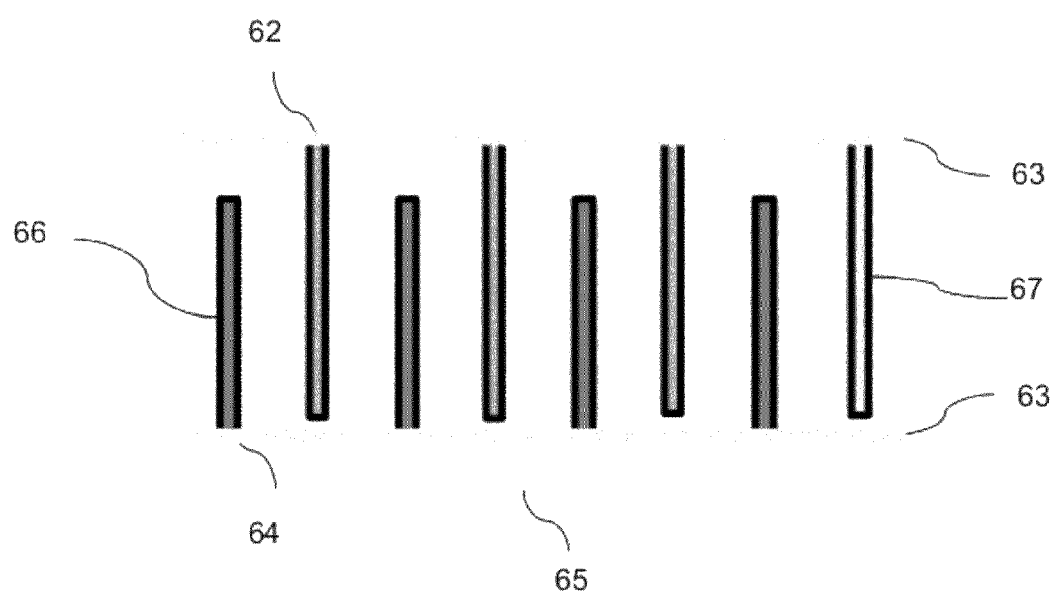
FIG. 6B illustrates the removal of unwanted current collector materials by an etching step.

The methods of the present invention can comprise selectively etching the current collector material to form the anode current collector 57 and the cathode current collector 56. FIG. 6A illustrates deposition of a current collector material on an electrode support structure 65 by a process such as sputter deposition. In a process like sputter deposition, the current collector material can be deposited on the substrate 63 as well as on the anode support structure 67 and the cathode support structure 66. As shown in FIG. 6A, the deposition process may result in unwanted current collector material like the current collector material connecting the anode support structure 67 to the cathode support structure 66. To remove unwanted current collector material, an etch step can be performed to remove current collector material from the substrate and/or the cathode support structure 64 and anode support structure 62 as shown in FIG. 6B.

The methods of the present invention can comprise pyrolyzing the current collector material once it is formed on the electrode support structure to form the current collector. The current collector can be formed by depositing a material that, when pyrolyzed, is conductive and adheres to both the anode and cathode support structures. This can be done using lithographic coating and patterning techniques. The current collector material can be applied as a coat over the electrode support structure. Then the current collector material can patterned using a mask process such that only the areas of the electrode support structure that are desirable to be coated remain coated. Alternatively a method of removing the material from non-targeted surfaces after the coating is complete can be used. One such technique is a directional etch of the current collector material after it has been applied on the electrode support structure. After patterning the material, the current collector material can be pyrolyzed to convert the material to an electrically conductive coating. An example of a current collector material that can be used in the above process to form a current collector is parylene. Parylene pyrolized at greater than 300° C. can form a conductive carbon material.

In separate embodiments, current collectors can be formed on the anode and cathode materials themselves rather than on the support structures. These embodiments results in a structure as shown in FIG. 2. The methods previously described for forming current collectors on electrode support structures can be used to form current collectors on the anode and cathode themselves rather than on the support structure. The methods of forming current collectors on the anode and cathode can also comprise sintering the current collector material to form a more cohesive bond between the current collector material and the anode or cathode material. These methods can also comprise selectively etching the current collector material to remove unwanted current collector material. These methods can also comprise pyrolyzing the deposited current collector material.

Although the invention has been described with reference to the presently preferred embodiments, it should be understood that various modifications could be made without departing from the scope of the invention.

What is claimed is:

1. A method of forming current collectors of an energy storage device comprising:
   forming an anode current collector and a cathode current collector that are electrically isolated from each other, the forming of the anode current collector and cathode current collector comprising (i) simultaneously depositing a current collector material on an anode support structure and on a cathode support structure to form the anode current collector and the cathode current collector, respectively, the anode support structure and the cathode support structure each extending from a substrate surface and each having an actual surface area that is greater than twice its geometrical surface area, and (ii) removing deposited current collector material, as necessary, after said simultaneous deposition step to electrically isolate the anode current collector from the cathode current collector.

2. The method of claim 1, wherein the current collector material is deposited on the anode support structure and on the cathode support structure by electrochemical deposition, electroless deposition, electrophoretic deposition, displacement deposition, or chemical vapor deposition.

3. The method of claim 1, wherein the current collector material is deposited on the anode support structure and on the cathode support structure by a printing technique or sputter deposition.

4. The method of claim 1, further comprising sintering the current collector material.

5. The method of claim 1, further comprising selectively etching the current collector material to electrically isolate the anode current collector from the cathode current collector.

6. The method of claim 1, further comprising pyrolyzing the current collector material.

7. The method of claim 1 wherein the method further comprises the step of forming an anode on the anode support structure and a cathode on the cathode support structure, and the current collector material is simultaneously deposited on the anode support structure and the cathode support structure by simultaneously depositing the current collector material onto the anode and the cathode formed on the anode support structure and cathode support structure, respectively.

8. The method of claim 7, wherein the current collector material comprises carbon, nickel or platinum.

9. The method of claim 7, wherein the current collector material is deposited on the anode and on the cathode by electrochemical deposition, electroless deposition, electrophoretic deposition, displacement deposition, or chemical vapor deposition.

10. The method of claim 7, wherein the current collector material is deposited on the anode and on the cathode by a printing technique or sputter deposition.

11. The method of claim 7, further comprising sintering the current collector material.

12. The method of claim 7, further comprising selectively etching the current collector material to electrically isolate the anode current collector from the cathode current collector.

13. The method of claim 7, further comprising pyrolyzing the current collector material.

14. The method of claim 7, wherein the current collector material comprises parylene.

15. The method of claim 6, wherein the current collector material comprises parylene.

16. The method of claim 1 wherein the deposited current collector material comprises carbon, nickel, platinum, titanium or tantalum.

17. The method of claim 1 wherein the deposited current collector material is alloyed or reacted with the anode, cathode, anode support structure or cathode support structure.

18. The method of claim 1 wherein the anode, cathode, anode support structure or cathode support structure comprises a semiconductor material and the deposited current collector material is alloyed with the semiconductor material.

19. The method of claim 18 wherein the deposited current collector material is nickel.

20. The method of claim 1 wherein the current collector material is simultaneously deposited onto the anode support structure to form an anode current collector and on the cathode support structure to form a cathode current collector, and an anode is formed on the anode current collector and a cathode is formed on the cathode current collector.

21. The method of claim 20 wherein the deposited current collector material comprises carbon, nickel, platinum, titanium or tantalum.

22. The method of claim 20 wherein the deposited current collector material is alloyed or reacted with the anode support structure or the cathode support structure.

23. The method of claim 20 wherein the current collector material is deposited on the anode support structure and on the cathode support structure by electrochemical deposition, electroless deposition, electrophoretic deposition, displacement deposition, or chemical vapor deposition.

24. The method of claim 20 further comprising sintering the current collector material.

* * * * *